United States Patent
Peng

(10) Patent No.: US 10,627,684 B2
(45) Date of Patent: Apr. 21, 2020

(54) LIQUID CRYSTAL MOTHER SUBSTRATE AND VERTICAL ALIGNMENT CURING METHOD THEREOF

(71) Applicant: SHENZHEN CHINA STAR OPTOELECTRONICS TECHNOLOGY CO., LTD., Shenzhen, Guangdong (CN)

(72) Inventor: Bangyin Peng, Shenzhen (CN)

(73) Assignee: SHENZHEN CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 107 days.

(21) Appl. No.: 15/578,346

(22) PCT Filed: Nov. 6, 2017

(86) PCT No.: PCT/CN2017/109505
§ 371 (c)(1),
(2) Date: Nov. 30, 2017

(87) PCT Pub. No.: WO2019/041544
PCT Pub. Date: Mar. 7, 2019

(65) Prior Publication Data
US 2019/0064573 A1    Feb. 28, 2019

(30) Foreign Application Priority Data
Aug. 30, 2017 (CN) .......................... 2017 1 0760347

(51) Int. Cl.
*G02F 1/1343* (2006.01)
*G02F 1/1337* (2006.01)
(Continued)

(52) U.S. Cl.
CPC ........ *G02F 1/13439* (2013.01); *G02F 1/1303* (2013.01); *G02F 1/13458* (2013.01);
(Continued)

(58) Field of Classification Search
CPC ..................................................... G02F 1/1343
See application file for complete search history.

(56) References Cited

U.S. PATENT DOCUMENTS

2013/0077007 A1 * 3/2013 Tajima .................. G02F 1/1345
349/41
2014/0098312 A1 * 4/2014 Kitani ................. G02F 1/13306
349/41
(Continued)

FOREIGN PATENT DOCUMENTS

CN           103760693     *   4/2014    .............. G02F 1/13
CN           103760693 A        4/2014
(Continued)

*Primary Examiner* — Sang V Nguyen
(74) *Attorney, Agent, or Firm* — Kirton McConkie; Evan R. Witt

(57) ABSTRACT

A liquid crystal mother substrate and a vertical alignment curing method thereof are provided and has one or more first color filter common electrode alignment signal inputting ends electrically connected to one or more sub electrode layers. One or more second color filter common electrode alignment signal inputting ends are electrically connected to another one or more sub electrode layers. The advantage of the liquid crystal mother substrate is that usage rate of the substrate is increased, and the liquid crystal substrate may be vertical alignment cured individually.

1 Claim, 5 Drawing Sheets

(51) Int. Cl.
*G02F 1/1345* (2006.01)
*G02F 1/13* (2006.01)
*G02F 1/1333* (2006.01)

(52) U.S. Cl.
CPC .. *G02F 1/133788* (2013.01); *G02F 1/134309* (2013.01); *G02F 1/133351* (2013.01); *G02F 2001/134345* (2013.01); *G02F 2201/121* (2013.01); *G02F 2201/123* (2013.01)

(56) References Cited

U.S. PATENT DOCUMENTS

| | | |
|---|---|---|
| 2015/0179666 A1 | 6/2015 | Chai |
| 2016/0161808 A1 | 6/2016 | Yoon et al. |

FOREIGN PATENT DOCUMENTS

| | | | | |
|---|---|---|---|---|
| CN | 105842897 A | | 8/2016 | |
| CN | 106094353 A | | 11/2016 | |
| CN | 106547155 | * | 3/2017 | ........... G02F 1/1362 |
| CN | 106547155 A | | 3/2017 | |
| JP | 2008203642 A | | 9/2008 | |
| KR | 1020160069935 A | | 6/2016 | |

* cited by examiner

LIQUID CRYSTAL MOTHER SUBSTRATE AND VERTICAL ALIGNMENT CURING METHOD THEREOF

FIELD OF THE INVENTION

The present invention relates to the liquid crystal display fields, especially to a liquid crystal mother substrate and a vertical alignment curing method thereof.

BACKGROUND OF THE INVENTION

Liquid crystal displays (LCDs) are most extensively used displays. Currently, in manufacturing liquid crystal display panels, multiple liquid crystal display panels are acquired by cutting a single piece of a liquid crystal mother substrate. With respect to the liquid crystal mother substrate, vertical light alignment curing is required. In other words, while the liquid crystal mother substrate is applied with a voltage, ultraviolet (UV) light radiation is applied causing a monomer reaction inside the liquid crystal panel such that liquid crystal alignment is achieved. At present, vertical alignment technologies are extensively used in the LCD industries of new generation. To assure that a liquid crystal under UV radiation forms a specific alignment angle, generally a UV light alignment machine (UVM machine) inputs an inverse voltage through a voltage applying device to drive the liquid crystal to rotate to form a pre-tilted angle. Typically, an edge of the liquid crystal substrate has multiple alignment curing signal inputting ends (curing pads), corresponding metal wires and balls conducted from the top to the bottom. The signal inputting end comprises a color filter common electrode (CF-Com) signal inputting end, a blue pixel (Blue) signal inputting end, a green pixel (Green) signal inputting end, a red pixel (Red) signal inputting end, a gate odd (Odd) signal inputting end, a gate even (Even) signal inputting end and an array circuit common electrode (A-Com) signal inputting end. The UV light alignment machine inputs corresponding voltage to the multiple signal inputting ends through the voltage applying device to implement vertical alignment.

A voltage applying method of a conventional vertical alignment curing technology electrifies the signal inputting end, and the current passes through wires and balls and then reaches and conducts the color filter substrate. The color filter common electrode (CF-Com) is electrified. In other words, the color filter common electrode curing (CF_COM Curing) technology (only a single voltage can be applied to the entire panel for vertical alignment curing). The shortage is that the metal wires are on a side of the thin film transistor (TFT) substrate and consumes considerable space. Furthermore, layouts with high large board usage rate such as 49UD Tri-gate and MMG 43&22 designs have the high large board usage rate at least 95%. The metal wires extend out of a film forming insurance region and easily results in impedance discontinuity of the vertical alignment metal wires due to ununiform of the film material and even further causes failures in etching and forming the metal wires.

Therefore, a new type liquid crystal mother substrate and a vertical alignment curing method are required urgently to solve the aforementioned issues.

SUMMARY OF THE INVENTION

To solve the aforementioned issues, the present invention provides a liquid crystal mother substrate and a vertical alignment curing method thereof that not only save the space of vertical alignment wires, but also increase the usage rate of a thin film transistor substrate and allows individually curing the liquid crystal substrate. Therefore, the method is the most ideal vertical alignment curing method for multi-model glass (MMG) products.

To solve the aforementioned issues, the present invention provides a liquid crystal mother substrate comprising: an upper substrate; a lower substrate disposed opposite to the upper substrate, the lower substrate comprising: one or more first type liquid crystal substrates, each first type liquid crystal substrate having a first alignment signal inputting set, the first alignment signal inputting set comprising a first color filter common electrode alignment signal inputting end, a first blue pixel alignment signal inputting end, a first green pixel alignment signal inputting end, a first red pixel alignment signal inputting end, a first gate odd alignment signal inputting end, a first gate even alignment signal inputting end and a first array circuit common electrode alignment signal inputting end; one or more second type liquid crystal substrates, each second type liquid crystal substrate having a second alignment signal inputting set, the second alignment signal inputting set comprising a second color filter common electrode alignment signal inputting end, a second blue pixel alignment signal inputting end, a second green pixel alignment signal inputting end, a second red pixel alignment signal inputting end, a second gate odd alignment signal inputting end, a second gate even alignment signal inputting end and a second array circuit common electrode alignment signal inputting end; the first blue pixel alignment signal inputting end, the first green pixel alignment signal inputting end, the first red pixel alignment signal inputting end, the first gate odd alignment signal inputting end, the first gate even alignment signal inputting end, the second blue pixel alignment signal inputting end, the second green pixel alignment signal inputting end, the second red pixel alignment signal inputting end, the second gate odd alignment signal inputting end and the second gate even alignment signal inputting end arranged adjacent to one another to form a first region; the first color filter common electrode alignment signal inputting end and the second color filter common electrode alignment signal inputting end disposed respectively on two sides of the first region; the transparent electrode layer cut along a border line between the first region and the first color filter common electrode alignment signal inputting end and second color filter common electrode alignment signal inputting end to form the sub electrode layers; the first array circuit common electrode alignment signal inputting end and the second array circuit common electrode alignment signal inputting end disposed in the first region; at least one false signal inputting end disposed between the first region and the first color filter common electrode alignment signal inputting end and second color filter common electrode alignment signal inputting end; and a transparent electrode layer disposed on a surface of the upper substrate facing the lower substrate, the transparent electrode layer comprising multiple sub electrode layer, one or more of the first color filter common electrode alignment signal inputting ends electrically connected to one or more of the sub electrode layers, one or more of the second color filter common electrode alignment signal inputting ends electrically connected to another one or more of the sub electrode layers.

The present invention provides a liquid crystal mother substrate, comprising: an upper substrate; a lower substrate disposed opposite to the upper substrate, the lower substrate comprising: one or more first type liquid crystal substrates, each first type liquid crystal substrate having a first alignment signal inputting set, the first alignment signal inputting set comprises a first color filter common electrode alignment signal inputting end; one or more second type liquid crystal substrates, each second type liquid crystal substrate having a second alignment signal inputting set, the second alignment signal inputting set comprising a second color filter common electrode alignment signal inputting end; and a transparent electrode layer disposed on a surface of the upper substrate facing the lower substrate, the transparent electrode layer comprising multiple sub electrode layer, one or more of the first color filter common electrode alignment signal inputting ends electrically connected to one or more of the sub electrode layers, one or more of the second color filter common electrode alignment signal inputting ends electrically connected to another one or more of the sub electrode layers.

In an embodiment, cutting the transparent electrode layer to form the sub electrode layers is based on a layout of the first type liquid crystal substrate and the second type liquid crystal substrate.

In an embodiment, each first alignment signal inputting set further comprises a first blue pixel alignment signal inputting end, a first green pixel alignment signal inputting end, a first red pixel alignment signal inputting end, a first gate odd alignment signal inputting end, a first gate even alignment signal inputting end and a first array circuit common electrode alignment signal inputting end; each second alignment signal inputting set further comprises a second blue pixel alignment signal inputting end, a second green pixel alignment signal inputting end, a second red pixel alignment signal inputting end, a second gate odd alignment signal inputting end, a second gate even alignment signal inputting end and a second array circuit common electrode alignment signal inputting end; the alignment signal inputting ends of the first alignment signal inputting set are arranged adjacent to one another, the alignment signal inputting ends of the second alignment signal inputting set are arranged adjacent to one another; the transparent electrode layer is cut along a border line between the first alignment signal inputting set and the second alignment signal inputting set to form the sub electrode layers.

In an embodiment, each first alignment signal inputting set further comprises a first blue pixel alignment signal inputting end, a first green pixel alignment signal inputting end, a first red pixel alignment signal inputting end, a first gate odd alignment signal inputting end, a first gate even alignment signal inputting end and a first array circuit common electrode alignment signal inputting end; each second alignment signal inputting set further comprises a second blue pixel alignment signal inputting end, a second green pixel alignment signal inputting end, a second red pixel alignment signal inputting end, a second gate odd alignment signal inputting end, a second gate even alignment signal inputting end and a second array circuit common electrode alignment signal inputting end; the first blue pixel alignment signal inputting end, the first green pixel alignment signal inputting end, the first red pixel alignment signal inputting end, the first gate odd alignment signal inputting end, the first gate even alignment signal inputting end, the second blue pixel alignment signal inputting end, the second green pixel alignment signal inputting end, the second red pixel alignment signal inputting end, the second gate odd alignment signal inputting end and the second gate even alignment signal inputting end are arranged adjacent to one another to form a first region; the first color filter common electrode alignment signal inputting end and second color filter common electrode alignment signal inputting end are disposed respectively on two sides of the first region; the transparent electrode layer is cut along a border line between the first region and the first color filter common electrode alignment signal inputting end the second color filter common electrode alignment signal inputting end to form the sub electrode layers.

In an embodiment, the first array circuit common electrode alignment signal inputting end and the second array circuit common electrode alignment signal inputting end are disposed in the first region.

In an embodiment, the first array circuit common electrode alignment signal inputting end and the second array circuit common electrode alignment signal inputting end are disposed respectively on two sides of the first region.

In an embodiment, at least one false signal inputting end is disposed between the first region and the first color filter common electrode alignment signal inputting end and second color filter common electrode alignment signal inputting end.

The present invention provides a vertical alignment curing method for a liquid crystal mother substrate. The liquid crystal mother substrate comprises an upper substrate and a lower substrate. A transparent electrode layer is disposed on a surface of the upper substrate facing the lower substrate. The lower substrate comprises one or more first type liquid crystal substrates and one or more second type liquid crystal substrates. Each first type liquid crystal substrate has a first alignment signal inputting set. The first alignment signal inputting set comprises a first color filter common electrode alignment signal inputting end. Each second type liquid crystal substrate comprises a second alignment signal inputting set. The second alignment signal inputting set comprises a second color filter common electrode alignment signal inputting end. The method comprises steps as follow: cutting the transparent electrode layer to form multiple sub electrode layers; electrically connecting one or more first color filter common electrode alignment signal inputting ends to one or more sub electrode layers, electrically connecting one or more second color filter common electrode alignment signal inputting ends to another one or more sub electrode layers; applying identical or different voltages respectively to the sub electrode layers when vertical alignment curing is implemented.

In an embodiment, cutting the transparent electrode layer to form the sub electrode layers is based on a layout of the first type liquid crystal substrate and second type liquid crystal substrate.

In an embodiment, each first alignment signal inputting set further comprises a first blue pixel alignment signal inputting end, a first green pixel alignment signal inputting end, a first red pixel alignment signal inputting end, a first gate odd alignment signal inputting end, a first gate even alignment signal inputting end and a first array circuit common electrode alignment signal inputting end; each second alignment signal inputting set further comprises a second blue pixel alignment signal inputting end, a second green pixel alignment signal inputting end, a second red pixel alignment signal inputting end, a second gate odd alignment signal inputting end, a second gate even alignment signal inputting end and a second array circuit common electrode alignment signal inputting end; the alignment signal inputting ends of the first alignment signal inputting set are arranged adjacent to one another; the alignment signal inputting ends of the second alignment signal inputting set are arranged adjacent to one another; the method comprises steps as follow: cutting the transparent electrode layer along a border line between the first alignment signal inputting set and the second alignment signal inputting set to form the sub electrode layers.

In an embodiment, each first alignment signal inputting set further comprises a first blue pixel alignment signal inputting end, a first green pixel alignment signal inputting end, a first red pixel alignment signal inputting end, a first gate odd alignment signal inputting end, a first gate even alignment signal inputting end and a first array circuit common electrode alignment signal inputting end; each second alignment signal inputting set further comprises a second blue pixel alignment signal inputting end, a second green pixel alignment signal inputting end, a second red pixel alignment signal inputting end, a second gate odd alignment signal inputting end, a second gate even alignment signal inputting end and a second array circuit common electrode alignment signal inputting end; the first blue pixel alignment signal inputting end, the first green pixel alignment signal inputting end, the first red pixel alignment signal inputting end, the first gate odd alignment signal inputting end, the first gate even alignment signal inputting end, the second blue pixel alignment signal inputting end, the second green pixel alignment signal inputting end, the second red pixel alignment signal inputting end, the second gate odd alignment signal inputting end and the second gate even alignment signal inputting end are arranged adjacent to one another to form a first region; the first color filter common electrode alignment signal inputting end and the second color filter common electrode alignment signal inputting end are disposed respectively on two sides of the first region; and the method comprises steps as follow: cutting the transparent electrode layer along a border line between the first region and the first color filter common electrode alignment signal inputting end and second color filter common electrode alignment signal inputting end to form the sub electrode layers.

The present invention has the follow advantages. The transparent electrode layer of the upper substrate of the liquid crystal mother substrate undergoes a specific laser patterning process to electrically connect the different parts of the color filter common electrode alignment signal inputting end and the transparent electrode layer of liquid crystal panels of different types. The transparent electrode layer is electrified to proceed with alignment. The lower substrate on the liquid crystal mother substrate needs no design of signal inputting ends, metal wires and balls, which not only saves the wiring space of the vertical alignment, but also increases usage rate of the liquid crystal mother substrate and allows individually curing one or more liquid crystal substrates. Therefore, the aforementioned method is the most ideal vertical alignment curing method for multi-model glass (MMG) products.

DETAILED DESCRIPTION OF THE PREFERRED EMBODIMENTS

Embodiments of a liquid crystal mother substrate and a vertical alignment curing method provided by the present invention will be described in details with the accompanied figures With reference to FIG. 1, the present invention provides a liquid crystal mother substrate, the liquid crystal mother substrate comprises an upper substrate (not marked in the figures) and a lower substrate 1 oppositely disposed. a transparent electrode layer (not marked in the figures) is disposed on a surface of the upper substrate facing the lower substrate 1. The lower substrate 1 comprises one or more first type liquid crystal substrates 2 and one or more second type liquid crystal substrates 3. In the multi-model glass (MMG) technologies, two differently sized liquid crystal display panels are generally designed and mixed onto a same liquid crystal mother substrate to increase the usage rate of the liquid crystal mother substrate. Specifically, in the present embodiment, liquid crystal display panels of 22 inches serve as first type liquid crystal substrates 2, and liquid crystal display panels of 43 inches serve as second type liquid crystal substrates 3. The substrates 2 and 3 are disposed hybridly to increase the usage of the liquid crystal mother substrate.

Figure 2:
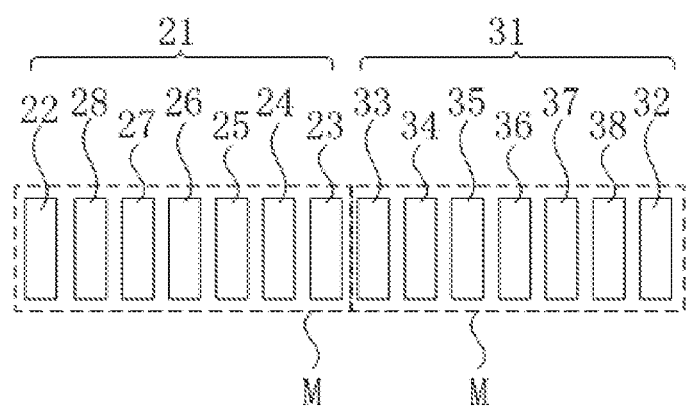
FIG. 2 is a schematic view of an alignment signal inputting end of the liquid crystal mother substrate of the present invention.

With reference to FIG. 2, each first type liquid crystal substrate 2 has a first alignment signal inputting set 21, each second type liquid crystal substrate 3 has a second alignment signal inputting set 31. In the first embodiment, only one first type liquid crystal substrate 2 and one second type liquid crystal substrate 3 are illustrated. The first alignment signal inputting set 21 comprises a first color filter common electrode alignment signal inputting end 22, a first blue pixel alignment signal inputting end 23, a first green pixel alignment signal inputting end 24, a first red pixel alignment signal inputting end 25, a first gate odd alignment signal inputting end 26, a first gate even alignment signal inputting end 27 and a first array circuit common electrode alignment signal inputting end 28. The second alignment signal inputting set 31 comprises a second color filter common electrode alignment signal inputting end 32, second blue pixel alignment signal inputting end 33, second green pixel alignment signal inputting end 34, second red pixel alignment signal inputting end 35, second gate odd alignment signal inputting end 36, second gate even alignment signal inputting end 37 and second array circuit common electrode alignment signal inputting end 38.

The transparent electrode layer comprises multiple sub electrode layers (not shown in the figures), the transparent electrode layer is cut based on a layout of the first type liquid crystal substrate 2 and the second type liquid crystal substrate 3 to form the sub electrode layer. One or more first color filter common electrode alignment signal inputting ends are electrically connected to one or more sub electrode layers. One or more second color filter common electrode alignment signal inputting ends are electrically connected to one or more sub electrode layers.

Figure 1:
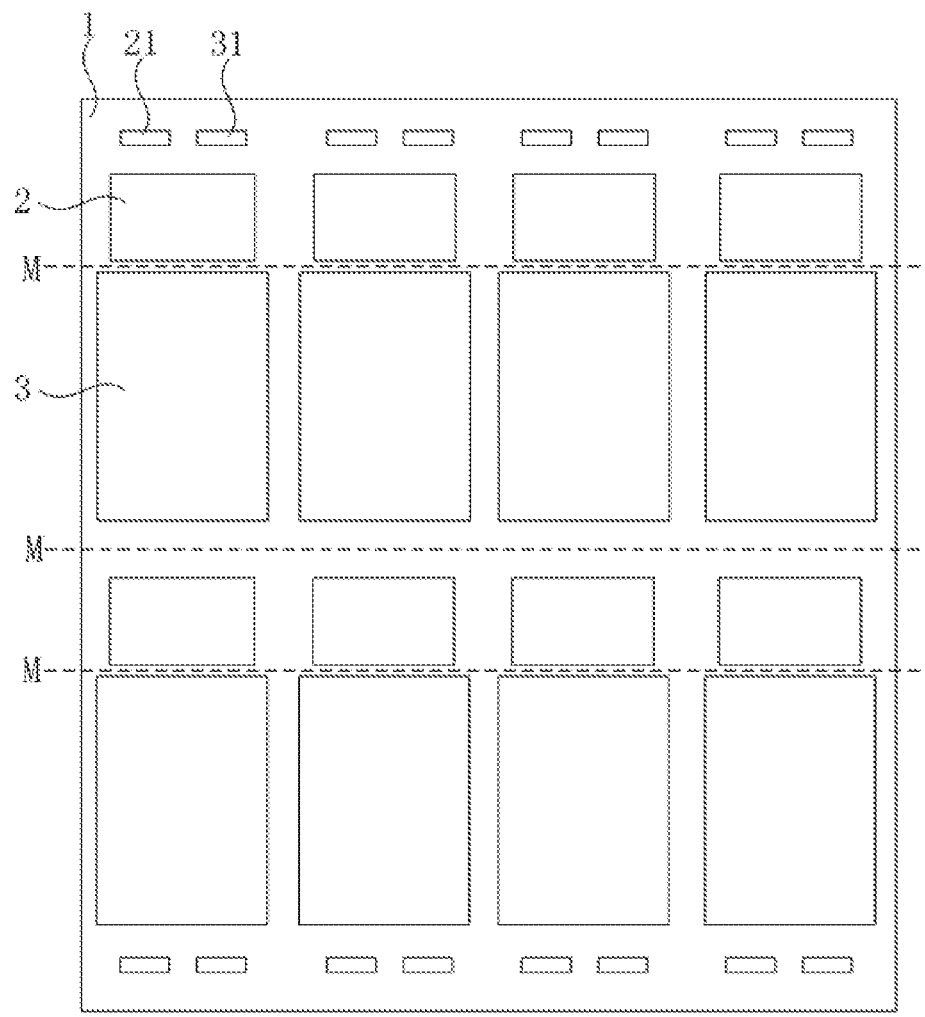
FIG. 1 is a schematic view of a cutting method for a transparent electrode layer of a first embodiment of a liquid crystal mother substrate of the present invention.

With reference to FIG. 1, in first embodiment of the present invention, laterally cutting the transparent electrode layer along border lines between the first type liquid crystal substrates 2 and the second type liquid crystal substrates 3 forms multiple bar-like sub electrode layers. The border line is shown as a broken line M in FIG. 1. A sub electrode layer corresponds to the multiple first type liquid crystal substrates 2, and another sub electrode layer adjacent to the former sub electrode layer corresponds to the multiple second type liquid crystal substrates 3. Each first color filter common electrode alignment signal inputting end 22 and each second color filter common electrode alignment signal inputting end 32 are connected respectively the corresponding sub electrode layers. Each sub electrode layer may be applied with same or different voltages. The multiple liquid crystal substrate corresponding to each sub electrode layer may be applied with the same voltage to proceed with vertical alignment curing. Different sub electrode layers may be applied with different voltages to proceed with vertical alignment curing to achieve the objective of vertical alignment curing the multiple liquid crystal substrates individually.

Figure 3:
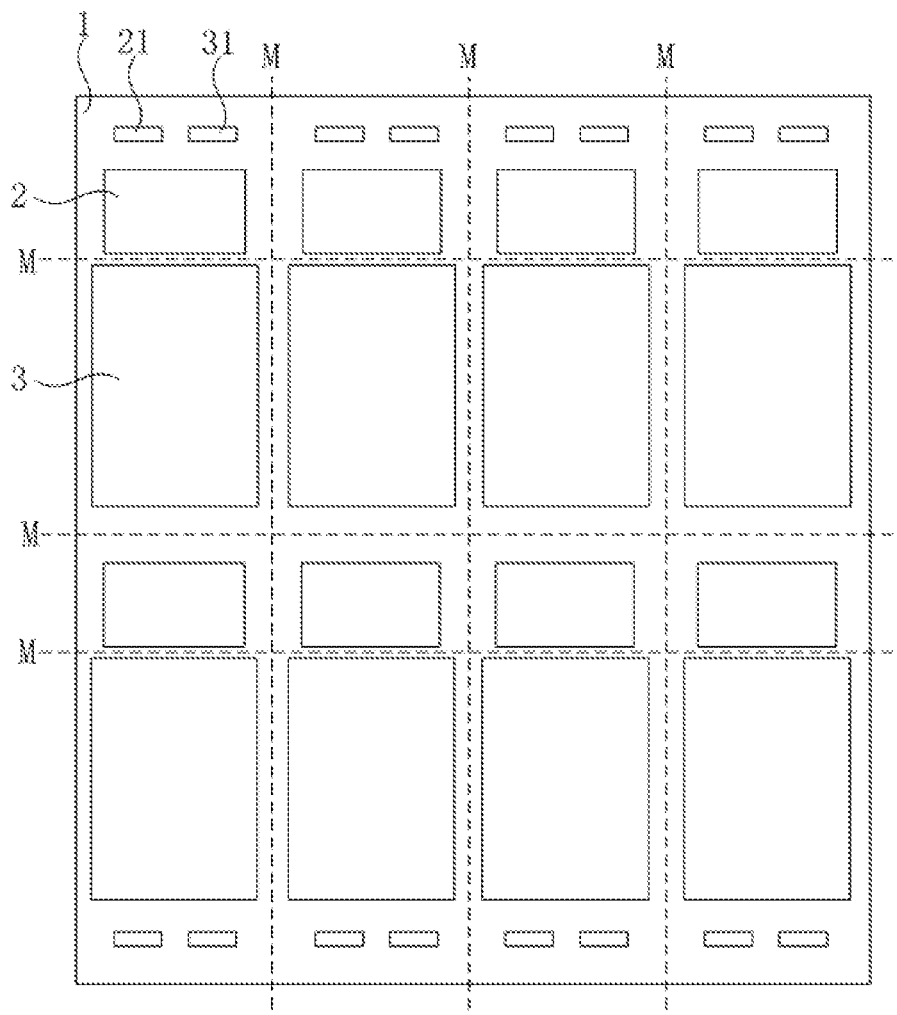
FIG. 3 is a schematic view of a cutting method for a transparent electrode layer of a second embodiment of a liquid crystal mother substrate of the present invention.

With reference to FIG. 3, in the second embodiment of the present invention, the transparent electrode layer is cut along border lines between adjacent liquid crystal substrates to form multiple sub electrode layers, and the border line is as a broken line M shown in FIG. 3. A sub electrode layer corresponds to a liquid crystal substrate, the color filter common electrode alignment signal inputting end of the liquid crystal substrate is electrically connected to the sub electrode layer, which achieves the objective of vertical alignment curing an individual liquid crystal substrate. Accordingly, when the cutting method of the embodiment is performed on the alignment signal inputting set, the alignment signal inputting ends of the first alignment signal inputting set 21 are arranged adjacent to one another, and the alignment signal inputting ends of the second alignment signal inputting set 31 are arranged adjacent to one another. The transparent electrode layer is cut along border lines between the first alignment signal inputting set 21 and the second alignment signal inputting set 31 to form multiple sub electrode layers.

Figure 4:
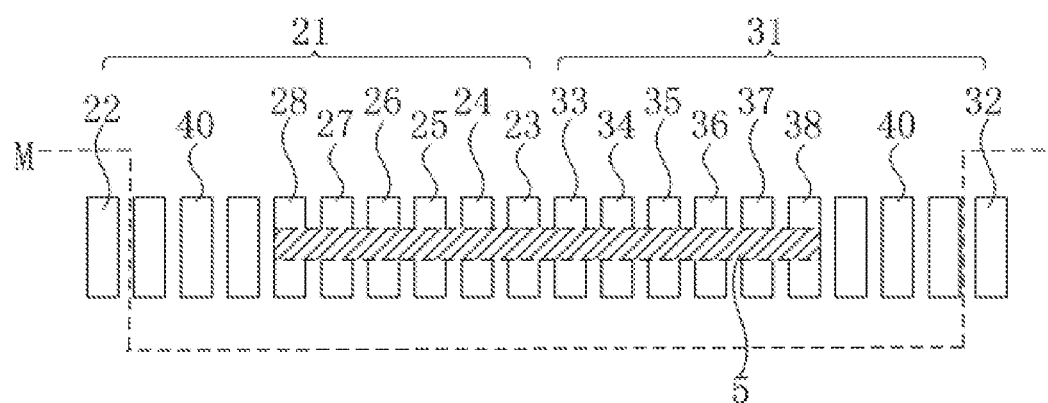
FIG. 4 is a schematic view of a cutting method for a transparent electrode layer of a third embodiment of a liquid crystal mother substrate of the present invention.

With reference to FIG. 4, in the third embodiment of the present invention, the first blue pixel alignment signal inputting end 23, the first green pixel alignment signal inputting end 24, the first red pixel alignment signal inputting end 25, the first gate odd alignment signal inputting end 26, the first gate even alignment signal inputting end 27, the second blue pixel alignment signal inputting end 33, the second green pixel alignment signal inputting end 34, the second red pixel alignment signal inputting end 35, the second gate odd alignment signal inputting end 36 and the second gate even alignment signal inputting end 37 are arranged adjacent to one another to form a first region. The first array circuit common electrode alignment signal inputting end 28 and the second array circuit common electrode alignment signal inputting end 38 are disposed in the first region. The first color filter common electrode alignment signal inputting end 22 and the second color filter common electrode alignment signal inputting end 32 are disposed respectively on two sides of the first region. The transparent electrode layer is cut along a border line between the first region and the first color filter common electrode alignment signal inputting end 22 and second color filter common electrode alignment signal inputting end 32 to form multiple sub electrode layers, and the border line is as a broken line shown in FIG. 4. In other embodiments of the present invention, an arrangement sequence of the alignment signal inputting ends of the first alignment signal inputting set 21 and the alignment signal inputting ends of the second alignment signal inputting set 31 in the first region may vary and is not limited by the present invention.

Figure 5:
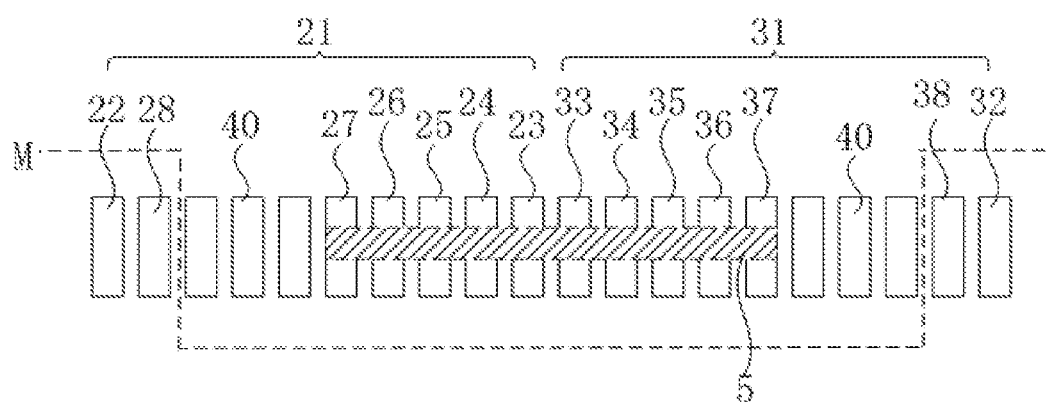
FIG. 5 is a schematic view of a cutting method for a transparent electrode layer of a fourth embodiment of a liquid crystal mother substrate of the present invention.

With reference to FIG. 5, the difference between the fourth embodiment and the third embodiment of the present invention is that the first array circuit common electrode alignment signal inputting end 28 and the second array circuit common electrode alignment signal inputting end 38 are disposed respectively in two sides of the first region. For example, the first array circuit common electrode alignment signal inputting end 28 is disposed between the first region and the first color filter common electrode alignment signal inputting end 22, and the second array circuit common electrode alignment signal inputting end 38 is disposed between the first region and the second color filter common electrode alignment signal inputting end 32. The transparent electrode layer is cut along a border line between the first array circuit common electrode alignment signal inputting end 28 and second array circuit common electrode alignment signal inputting end 38 and the first region to form multiple sub electrode layers, and the border line is as a broken line M as shown in FIG. 5.

The present invention also provides a vertical alignment curing method for a liquid crystal mother substrate. The method comprises steps as follows:

Cutting the transparent electrode layer to form multiple sub electrode layers. The cutting method is as described above and will not be repeated. In the current step, the transparent electrode layer is no longer an entire transparent electrode layer and is divided into multiple sub electrode layers. Furthermore, the sub electrode layers are insulated from one another.

Electrically connecting one or more first color filter common electrode alignment signal inputting ends to one or more sub electrode layers, and electrically connecting one or more second color filter common electrode alignment signal inputting ends to another one or more sub electrode layers. In the current step, one sub electrode layer may be electrically connected to the color filter common electrode alignment signal inputting end of one liquid crystal substrate, and may be electrically connected to color filter common electrode alignment signal inputting ends of multiple liquid crystal substrate of the same type. However, one sub electrode layer cannot be electrically connected to color filter common electrode alignment signal inputting ends of two liquid crystal substrates of different types.

Applying different voltages to the sub electrode layers when vertical alignment curing is implemented. In the current step, each sub electrode layer may be applied with a different voltage. The value of the applied voltage may be decided based on requirement of the liquid crystal substrate in practice. For example, the sub electrode layer corresponding to the first type liquid crystal substrate is applied with a first voltage of the same value, the sub electrode layer corresponding to the second type liquid crystal substrate is applied with a second voltage of the same value, and the first voltage and the second voltage are different.

When the present invention liquid crystal mother substrate employs a conventional vertical alignment curing technology for alignment, the alignment signal inputting ends are input with electrical signals according to the conventional vertical alignment curing method. When a color filter common electrode patterning technology is adopted for alignment, the transparent electrode layer is cut according to the aforementioned cutting method to divide the transparent electrode layer into multiple sub electrode layers. The sub electrode layers are insulated. A conductive coating layer 5 may be coated in the first region to electrically connect the alignment signal inputting ends in the first region. When alignment is implemented, the alignment signal inputting end of the first region is connected a low electrical potential. The first color filter common electrode alignment signal inputting end 22 is electrically connected to one or more sub electrode layers, the second color filter common electrode alignment signal inputting end 32 is electrically connected to another one or more sub electrode layers, and all are connected to a high electrical potential to achieve the objective of vertical alignment curing one or more liquid crystal substrates individually. The conductive coating layer 5 may be a gold (Au) conductive coating layer.

Preferably, at least one false signal inputting end 40 is disposed between the first region and the first color filter common electrode alignment signal inputting end 22 and second color filter common electrode alignment signal inputting end 32. The false signal inputting end 40 is configured to insulate the first region from the first color filter common electrode alignment signal inputting end 22 and second color filter common electrode alignment signal inputting end 32 when the conductive coating layer 5 is coated to prevent the conductive coating layer 5 from being coated on the first color filter common electrode alignment signal inputting end 22 and second color filter common electrode alignment signal inputting end 32. The false signal inputting end 40 is not input with any signals. For convenience and aesthetics purposes, a size of the false signal inputting end 40 is the same as sizes of other inputting ends. Multiple false signal inputting ends 40 are disposed between the first region and the first color filter common electrode alignment signal inputting end 22 and second color filter common electrode alignment signal inputting end 32 to enhance the insulation effect of the false signal inputting ends 40.

The aforementioned description is mere about the preferred embodiments of the present invention. It should be understood that a person of ordinary skill in the art may has improvements and modifications without departing from the principles of the present invention. Such improvements and modifications should be deemed to be within the extent of the scope of the present invention.

What is claimed is:

1. A liquid crystal mother substrate, comprising:
an upper substrate;
a lower substrate disposed opposite to the upper substrate, the lower substrate comprising:
one or more first type liquid crystal substrates, each first type liquid crystal substrate having a first alignment signal inputting set, the first alignment signal inputting set comprising a first color filter common electrode alignment signal inputting end, a first blue pixel alignment signal inputting end, a first green pixel alignment signal inputting end, a first red pixel alignment signal inputting end, a first gate odd alignment signal inputting end, a first gate even alignment signal inputting end and a first array circuit common electrode alignment signal inputting end;
one or more second type liquid crystal substrates, each second type liquid crystal substrate comprising a second alignment signal inputting set, the second alignment signal inputting set comprising a second color filter common electrode alignment signal inputting end, a second blue pixel alignment signal inputting end, a second green pixel alignment signal inputting end, a second red pixel alignment signal inputting end, a second gate odd alignment signal inputting end, a second gate even alignment signal inputting end and a second array circuit common electrode alignment signal inputting end, the first blue pixel alignment signal inputting end, the first green pixel alignment signal inputting end, the first red pixel alignment signal inputting end, the first gate odd alignment signal inputting end, the first gate even alignment signal inputting end, the second blue pixel alignment signal inputting end, the second green pixel alignment signal inputting end, the second red pixel alignment signal inputting end, the second gate odd alignment signal inputting end and the second gate even alignment signal inputting end arranged adjacent to one another to form a first region; the first color filter common electrode alignment signal inputting end and the second color filter common electrode alignment signal inputting end disposed respectively on two sides of the first region; the transparent electrode layer cut along a border line between the first region and the first color filter common electrode alignment signal inputting end and second color filter common electrode alignment signal inputting end to form the sub electrode layers; the first array circuit common electrode alignment signal inputting end and the second array circuit common electrode alignment signal inputting end disposed in the first region;
at least one false signal inputting end disposed between the first region and the first color filter common electrode alignment signal inputting end and second color filter common electrode alignment signal inputting end; and
a transparent electrode layer disposed on a surface of the upper substrate facing the lower substrate, the transparent electrode layer comprising multiple sub electrode layers, one or more of the first color filter common electrode alignment signal inputting ends electrically connected to one or more of the sub electrode layers, one or more of the second color filter common electrode alignment signal inputting ends electrically connected to another one or more of the sub electrode layers.

* * * * *